United States Patent [19]

Shoffner

[11] Patent Number: 4,892,442
[45] Date of Patent: Jan. 9, 1990

[54] PRELUBRICATED INNERDUCT
[75] Inventor: John Shoffner, Middlesboro, Ky.
[73] Assignee: Dura-Line, Middlesboro, Ky.
[21] Appl. No.: 21,237
[22] Filed: Mar. 3, 1987
[51] Int. Cl.$^4$ .............................................. F16L 1/00
[52] U.S. Cl. .................................... 405/154; 138/141; 264/173; 405/156
[58] Field of Search ................ 405/154, 156; 138/141, 138/140, DIG. 3, DIG. 7; 264/173, 209.3; 285/55

[56] References Cited

U.S. PATENT DOCUMENTS

| | | | |
|---|---|---|---|
| 3,595,312 | 7/1971 | Matthews | 405/168 X |
| 3,602,263 | 8/1971 | Bremmer | |
| 3,794,081 | 2/1974 | Fiser et al. | 138/141 |
| 4,104,095 | 8/1978 | Shaw | 138/DIG. 3 |
| 4,232,981 | 11/1980 | Lee | 405/154 |
| 4,289,172 | 9/1981 | Ekstrom | 138/137 X |
| 4,299,256 | 11/1981 | Bacehowski et al. | 138/141 X |
| 4,312,383 | 1/1982 | Kleykamp | 138/141 X |
| 4,330,173 | 5/1982 | Oestreich | |
| 4,386,628 | 6/1983 | Stanley | 264/173 X |
| 4,410,476 | 10/1983 | Redding et al. | 264/173 |
| 4,565,351 | 1/1986 | Conti et al. | |
| 4,640,313 | 2/1987 | Stanley | 264/173 X |
| 4,688,966 | 8/1987 | Esparza | 405/169 X |

Primary Examiner—Dennis L. Taylor
Attorney, Agent, or Firm—Cushman, Darby & Cushman

[57] ABSTRACT

An innerduct is disclosed which can fit inside a preexisting conduit and extend along the length thereof or can be directly buried with a plow or in an open trench, for receiving transmission cables and, in particular, fiber optic cables. The innerduct is formed by coextruding first and second materials, the material for the inner portion of the innerduct including a lubricous material impregnated therein so that friction is reduced between the inner surface of the interduct and cables which are pulled therethrough. Ribs can be provided on the inner and outer surfaces of the innerduct of the duct can be formed with undulated walls so as to further reduce friction between same and cables slid therethrough by minimizing the surface contact between these elments. The ribs and/or undulations also faciliate the dissipation of heat due to friction of assembly, heat during the extrusion process, and from ambient sources of heat.

10 Claims, 2 Drawing Sheets

PRELUBRICATED INNERDUCT

BACKGROUND OF THE INVENTION

This invention relates to innerducts which facilitate the installation of communication and power transmission cables in existing conduits and, more particularly, to a prelubricated innerduct which provides a low friction and hazardless environment for the installation and placement of fiber optic cables.

Fiber optic cables are currently being provided as a substitute for a great deal of the copper cable heretofore utilized in the telecommunication industry. Fiber optic cables or "light guide" cables are preferred in that they are capable of transmitting a substantially greater amount of information while occupying a substantially smaller amount of space than conventional copper cable. The fiber optic cables are typically encased in a polyethylene sheath which acts as a protective coating for the fiber optic elements, which are formed from glass.

The cables are installed in innerducts which have been placed in existing, typically subterraneal, conduits from which the copper cables have been removed or in innerducts buried directly in the ground. The innerducts are used to provide for substantially low friction placement of and a hazardless environment for the fiber optic cable(s).

Nevertheless, it has been discovered that it is difficult to install innerducts into existing conduits because of the friction between the exterior wall of the innerduct and that the interior wall of the existing conduit. In addition, once the inner duct has been installed, there is friction between the inner wall of the innerduct and the fiber optic cables as they are inserted into and along the innerduct. To overcome these frictional problems, various water-soluable polymeric lubricants have been used. These lubricants are generally of the glycol type. However, because the existing conduits within which the innerducts are placed are typically 3-4 inch PVC pipe, 3-4 inch square terra cotta pipe or the like, the innerducts must have a rather small diameter. In addition, the innerduct itself can have a length of up to 10,000 feet or more. Therefore, the application of lubricant to the entire interior surface of the innerduct presents a substantial burden. Further, even if lubricant is applied to a substantial portion of the innerduct interior or to the cable itself, repeated relative sliding movement due to removing or replacing cables within the innerduct will reduce the amount of lubricant disposed therein Further, due to the time required to place long lengths of cable, liquid lubricants tend to dry, thereby losing their effectiveness before the placing operation is complete.

Yet another problem encountered with existing innerducts is that after the ducts are extruded, because of the great length required, the extruded tubing is immediately wrapped or rolled about a spool or the like for subsequent transport to a storage facility or installation location. Since the extruded material is so readily wrapped for transport, it has been found that the tubing may not be completely cooled prior to rolling. Accordingly, the tube's cross-sectional shape can be distorted into an ellipse that has a major dimension which prohibits the insertion thereof into an existing conduit and/or a minor dimension which prevents the placement of the desired diameter of fiber optic cable therein. Further, regions of potentially greater friction during installation are generated when the innerduct is distorted in this manner.

SUMMARY OF THE INVENTION

It is, therefore, an object of the present invention to provide an innerduct and method of producing an innerduct which exhibits both properties of high tensile strength to facilitate placement within an existing conduit or buried directly in the ground, as well as a highly lubricous inner layer to aid in the placement of a cable or the like therethrough.

Another object of the present invention to form an intergral innerduct by coextruding an outer jacket of high tensile strength polymer and an inner barrier layer of highly lubricous polymer.

It is a further object of the present invention to provide an innerduct which has an inner layer impregnated with lubricous material so that in the event there is wear of the tubes inner walls during cable placement, the wear will only expose further lubricants and not increase friction between the respective elements during the duct or cable replacement operation.

It is an object of the present invention, in accordance with a preferred embodiment, to provide a means for reducing surface contact between the sliding elements and, accordingly, further reduce friction between the innerduct and the conduit in which it is placed as well as between the innerduct and the cables that are pulled therethrough.

Yet another object of the present invention, in accordance with a preferred embodiment, is to provide a means for dissipating heat generated during the extrusion process, the placement operation and subsequent use of the tube.

The foregoing objects are realized in accordance with the present invention by providing a unique prelubricated innerduct having a coextruded inner core of a material impregnated with a lubricous agent to lower its coefficient of friction to other objects, such as fiber optic cables being pulled therethrough. More particularly, the innerduct is produced by coextrusion methods so as to form an outer jacket of a high tensile strength polymer such as high molecular weight, high density polyethylene and an inner layer of high molecular weight lubricous polymer compound, such as Teflon ®, silicone impregnated polyethylene, graphite impregnated polyethylene or the like. A third, outermost layer can also be provided which carries pigments, stabilizers, lubricants, etc., allowing the main outer jacket of the innerduct to be free of additives. Thus, an innerduct formed in accordance with the present invention exhibits both the properties of high tensile strength to facilitate the conduit's placement as well as a highly lubricous inner layer to aid in the placement of a cable, for example, within the conduit.

The multilayer tube may take any desired shape such as round, square, or other shape required for its final use. Also, the cable to be placed into the innerduct may be either tight or loose fitted into the innerduct. Further in a preferred embodiment of the present invention, the coextruded innerduct can be formed with inner projecting ribs and/or outer projecting ribs or with undulations in the walls thereof so as to reduce the surface area contact between the innerduct and associated cables or transmission lines passed therethrough as well as between the conduit within which the innerduct is placed and the innerduct. Reducing the surface contact between the respective sliding elements reduces the friction between the same, thereby facilitating sliding movement during insertion and reducing damage from wear. Further, the provision of projecting ribs or undulations in the walls also facilitates dissipation of heat from the innerduct due to friction between the sliding elements and due to ambient sources of heat. This protects the fiber optic cables disposed within the innerduct. In addition, the provision of ribs or undulations facilitates rapid cooling of the innerduct immediately following extrusion and before winding about a spool or the like. Thus, an innerduct formed in accordance with the present invention will be thoroughly cooled before rolling so that same will not be distorted into an ellipse by the rolling operation and the deleterious consequences will be avoided.

BRIEF DESCRIPTION OF THE DRAWINGS

Other objects, features and characteristics of the present invention, as well as methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures and wherein:

DETAILED DESCRIPTION OF THE PREFERRED EMBODIMENT

Figure 1:
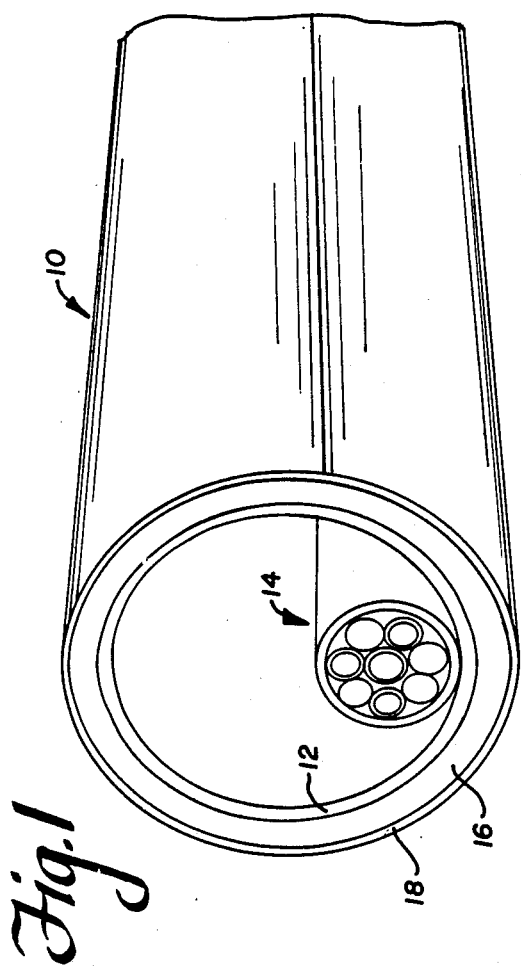
FIG. 1 is a perspective view of an innerduct formed in accordance with the present invention with a fiber optic cable disposed therein.

Referring to FIG. 1, an innerduct 10 formed in accordance with the present invention is illustrated. The innerduct has a coextruded inner core 12 of a material impregnated with a lubricous agent to lower the coefficient of friction to other objects such as a fiber optic cable 14 pulled therethrough. Of course, other objects may be pulled through an innerduct such as, but not limited to, pull lines, transmission lines and the like. The tube, which is produced by coextrusion methods, also includes an outer jacket 16 which is formed of a high tensile strength polymer such as high molecular weight, high density polyethylene. Inner layer 12, as was stated above, is impregnated with a lubricous agent. A suitable material for inner layer 12 would be, for example, Teflon®, silicone impregnated polyethylene, graphite impregnated polyethylene, or the like. Where the inner layer is formed from silicone impregnated polyethylene, the concentration of silicone in relation to polyethylene is between about 0.01% and about 20% by weight.

Figure 2:
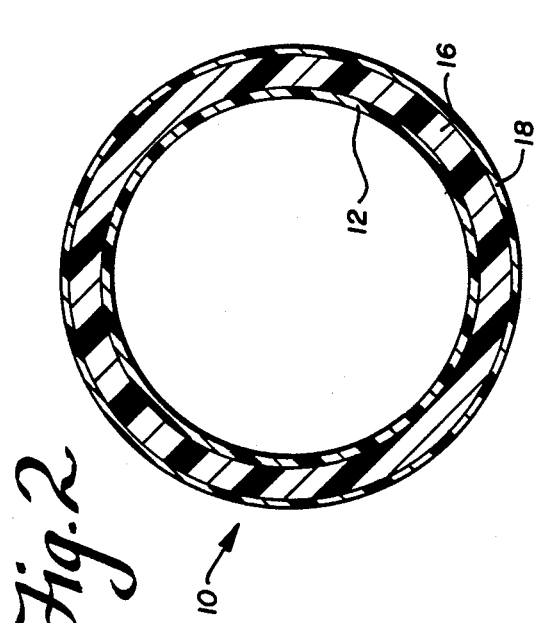
FIG. 2 is a cross sectional view of the tube illustrated in FIG. 1 with the fiber optic cable omitted for clarity.

As illustrated in FIG. 2, a third layer 18 can also be provided which carries pigments, stabilizers, lubricants, or the like. The provision of an additional layer 16 for carrying pigments and the like enables the main outer jacket or layer 16 to be formed free of pigment. Thus, an innerduct 10 formed in accordance with the present invention provides an intergral conduit which exhibits both the properties of high tensile strength due to its outer layer 16 to facilitate its placement within a preexisting conduit or directly in the ground as well as a highly lubricous inner layer 12 to aid in the placement of cable 14, for example, within duct 10. Further, should the interior surface of inner layer 12 be worn for example from placement of the cable(s) 14 and/or the winch line used to place the same, the wear will only expose further lubricated material and will not increase friction. Hence, inner layer 12 of tube 10 is permanently lubricated.

Though in the illustrated embodiment, multilayer prelubricated innerduct 10 is circular in cross-section, it is to be understood that tube 10 may take any desired shape such as round, ellipsoid, triangular, square or other shape required for its final use.

Figure 3:
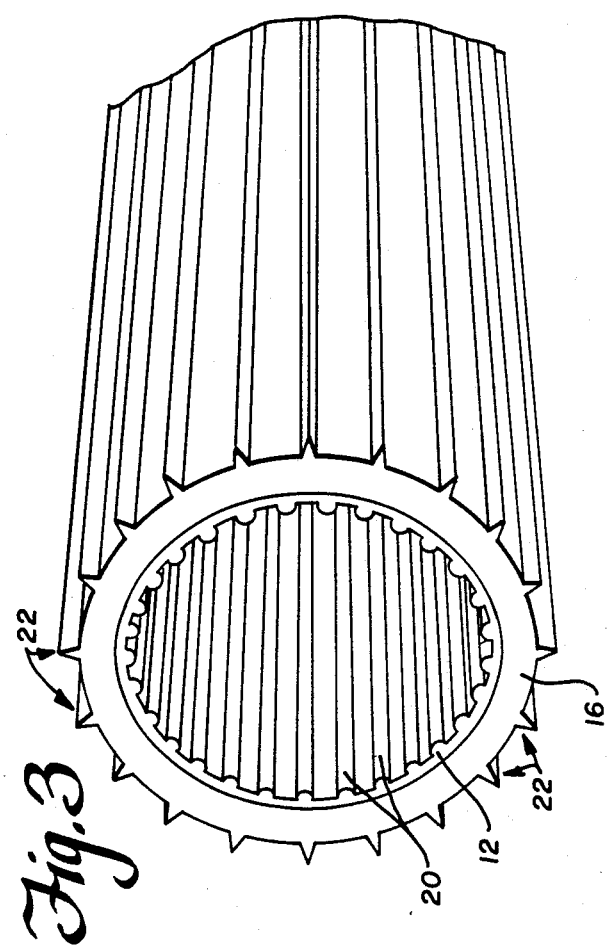
FIG. 3 is a perspective view of an alternate embodiment of an innerduct formed in accordance with the present invention.
Figure 4:
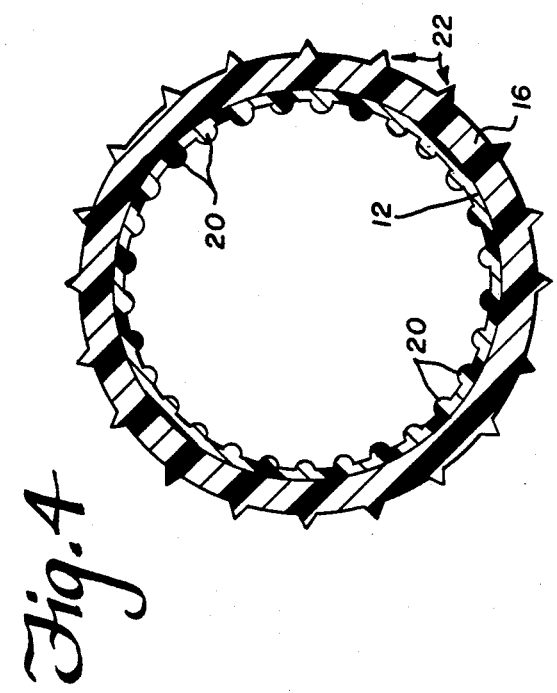
FIG. 4 is a cross sectional view of the innerduct illustrated in FIG. 3.
Figure 5:
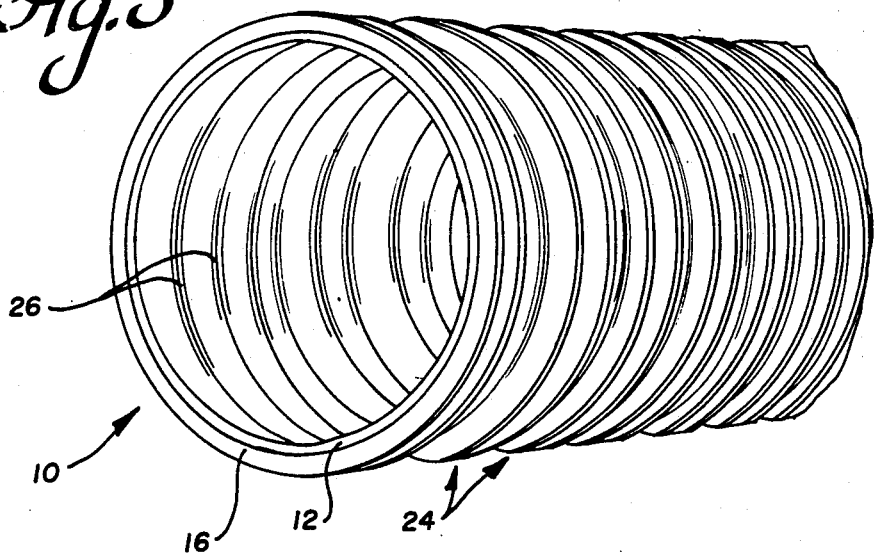
FIG. 5 is a perspective view of yet another embodiment of an innerduct formed in accordance with the present invention.

Referring in particular to FIGS. 3-5, in the preferred embodiment of the present invention, tube 10 can be formed with inner projecting ribs 20 and/or outer projecting ribs 22. Alternately, the wall of tube 10 can be formed with undulations having outer portions 24 and inner portions 26, as shown in FIG. 5. The provision of inner projecting ribs and/or outer projecting ribs or undulations in the walls reduces the contact surface area between innerduct 10 and cables 14 or the like passed therethrough as well as between innerduct 10 and the preexisting conduit (not shown) through which it is placed. Reducing the surface contact between these sliding elements reduces the friction between the same and therefore augments the friction reducing characteristics of lubricous inner layer 12.

The provision of ribs 20, 22 or undulations 24, 26 serves the additional function of dissipating heat generated during the extrusion process, placement operations, subsequent use, and removal or replacement of the various conduits and cables. The heat dissipation characteristics of the tube, then, protects the associated fiber optic cables and minimizes distortion of the extruded tube during subsequent winding or rolling about a spool.

An additional advantage o providing ribs on the inner and/or outer surfaces of innerduct 10 in accordance with the present invention is the enhancement of the structural integrity of the tube. More particularly, the inclusion of ribs provides resistance to kinking or collapse of the innerduct during placement and subsequent use without substantially increasing the thickness or weight of the innerduct.

The number and size of ribs 20, 22 or undulations 24, 26 provided on the interior and exterior of the innerduct of the present invention is, of course, dependent on the amount of heat dissipation desired, the relative sizes of the sliding elements and the requisite resistance to kinking and collapse. More particularly, the more ribs, that are provided about the circumference of tube or duct 10, the greater structural strength provided thereby and the greater amount of heat that may be dissipated. However, the greater the number of ribs that are provided, the more surface contact there will be between the innerduct and the associated tubes. Accordingly, the more ribs, the greater the friction between the elements as well as heat generated from friction. Thus, the optimum number of ribs about the tube or the number of undulations per unit length will be readily apparent with the ordinary artisan upon reviewing this specification together with the accompanying drawings.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit of the scope of the appended claims.

What the claim is:

1. A relatively flexible coextruded plastic tube for slidably receiving and providing a protective housing for a cable, said tube consisting essentially of a pair of telescopically related inner and outer cylindrical portions, said inner portion being formed from a highly lubricous polymeric material to provide a permanently lubricated inner surface for the tube which has a low coefficient of friction to enable substantially low friction placement of the cable therewithin and said outer portion being formed from a high tensile strength polymeric material for maintaining the structural integrity so that a protective housing is defined for the cable by the tube.

2. A coextruded tube as in claim 1, wherein said highly lubricous polymeric material is chosen from the group consisting of Teflon®, silicone impregnated polyethylene, and graphite impregnated polyethylene.

3. A coextruded tube as in claim 2, wherein said highly lubricous polymeric material is silicone impregnated polyethylene and the concentration of the silicone in relation to the polyethylene resin is between about 0.01% and about 20% by weight.

4. A coextruded tube as in claim 1, wherein said high tensile strength polymeric material comprises high molecular weight, high density polyethylene.

5. A coextruded tube as in claim 1, wherein at least one of the inner surface and the outer surface of the tube includes radially protruding, longitudinally extending ribs, said ribs extending along at least a portion of the length of said tube.

6. A coextruded tube as in claim 2, wherein at least one of the inner surface and the outer surface of the tube includes radially protruding, longitudinally extending ribs, said ribs extending along at least a portion of the length of said tube.

7. A coextruded tube as in claim 1, wherein the walls of the tube have alternating circumferentially inwardly directed portions and circumferentially outwardly directed portions along at least a portion of the length thereof.

8. A coextruded tube as in claim 2, wherein the walls of the tube have alternating circumferentially inwardly directed portions and circumferentially outwardly directed portions along at least a portion of the length thereof.

9. A prelubricated innerduct for installing at least one of a cable, a rod, or a tube in a length of conduit, said prelubricated innerduct slidably receiving and providing a protective housing for said cable, rod, or tube, said prelubricated innerduct consisting essentially of:

a coextruded plastic tube having inner and outer cylindrical portions, said inner portion being formed from a highly lubricous polymeric material to provide a permanently lubricated inner surface for the innerduct which has a low coefficient of friction to enable substantially low friction placement of the cable, rod, or tube therewithin and said outer portion being formed from a high tensile strength polymeric material for maintaining the structural integrity of the innerduct during placement in the conduit and for providing a protective housing for the cable, rod, or tube.

10. An innerduct as in claim 9, wherein said inner portion includes a highly lubricous polymeric material chosen from the group consisting of Teflon®, silicone impregnated polyethylene, and graphite impregnated polyethylene and said outer portion includes high molecular weight, high density polyethylene.

* * * * *

(12) EX PARTE REEXAMINATION CERTIFICATE (6228th)
United States Patent
Shoffner

(10) Number: US 4,892,442 C1
(45) Certificate Issued: May 20, 2008

(54) PRELUBRICATED INNERDUCT

(75) Inventor: John Shoffner, Middlesboro, KY (US)

(73) Assignee: Dura-Line Corporation, Knoxville, TN (US)

Reexamination Request:
No. 90/006,888, Dec. 15, 2003

Reexamination Certificate for:
Patent No.: 4,892,442
Issued: Jan. 9, 1990
Appl. No.: 07/021,237
Filed: Mar. 3, 1987

(51) Int. Cl.
*E02F 5/10* (2006.01)
*F16L 1/00* (2006.01)

(52) U.S. Cl. .................... 405/183.5; 138/108; 138/121; 138/137; 138/141; 174/68.3; 264/171.27; 264/172.1; 405/156

(58) Field of Classification Search .................... None
See application file for complete search history.

(56) References Cited

U.S. PATENT DOCUMENTS

| | | |
|---|---|---|
| 3,602,263 A | 8/1971 | Bremner |
| 4,104,095 A | 8/1978 | Shaw |
| 4,299,256 A | 11/1981 | Bacehowski et al. |
| 4,312,383 A | 1/1982 | Kleykamp |
| 4,330,173 A | 5/1982 | Oestreich |
| 4,410,476 A | 10/1983 | Redding et al. |
| 4,565,351 A | 1/1986 | Conti et al. |

FOREIGN PATENT DOCUMENTS

GB 2156837 A 10/1985

*Primary Examiner*—Beverly M. Flanagan

(57) ABSTRACT

An innerduct is disclosed which can fit inside a preexisting conduit and extend along the length thereof or can be directly buried with a plow or in an open trench, for receiving transmission cables and, in particular, fiber optic cables. The innerduct is formed by coextruding first and second materials, the material for the inner portion of the innerduct including a lubricous material impregnated therein so that friction is reduced between the inner surface of the interduct and cables which are pulled therethrough. Ribs can be provided on the inner and outer surfaces of the innerduct of the duct can be formed with undulated walls so as to further reduce friction between same and cables slid therethrough by minimizing the surface contact between these elements. The ribs and/or undulations also facilitate the dissipation of heat due to friction of assembly, heat during the extrusion process, and from ambient sources of heat.

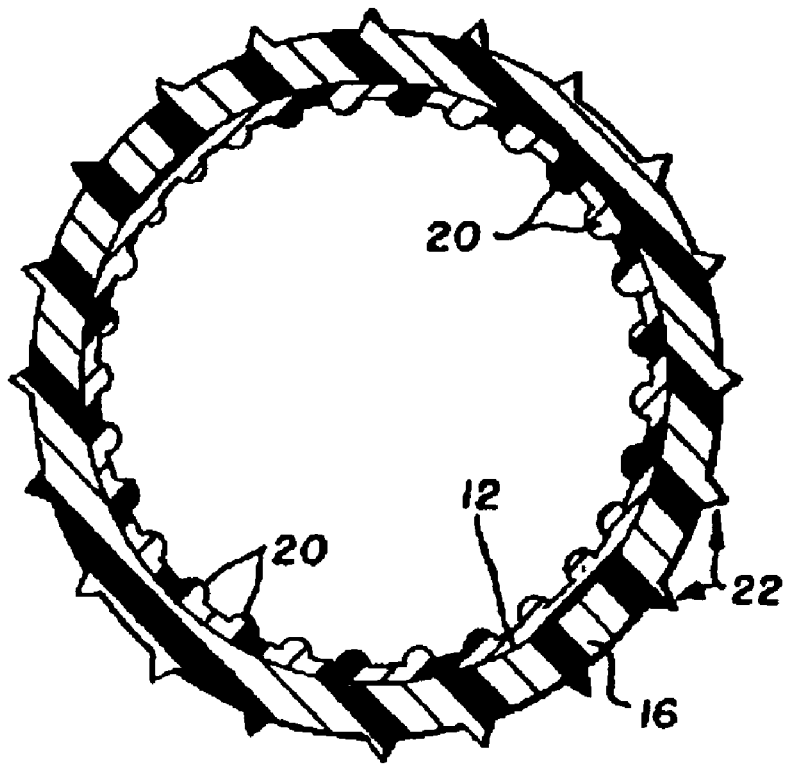

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7 and 8 is confirmed.

Claims 1–6, 9 and 10 are cancelled.

\* \* \* \* \*